(12) United States Patent
Choi et al.

(10) Patent No.: US 7,126,662 B2
(45) Date of Patent: Oct. 24, 2006

(54) TRANSFLECTIVE LIQUID CRYSTAL DISPLAY DEVICE COMPRISING A PATTERNED SPACER WHEREIN THE BUFFER LAYER AND THE SPACER ARE A SINGLE BODY AND METHOD OF FABRICATING THE SAME

(75) Inventors: Su-Seok Choi, Gyounggi-do (KR); Sang-Min Jang, Gyeonggi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 97 days.

(21) Appl. No.: 10/742,783

(22) Filed: Dec. 23, 2003

(65) Prior Publication Data

US 2004/0135945 A1    Jul. 15, 2004

(30) Foreign Application Priority Data

Dec. 31, 2002  (KR) .................... 10-2002-0088298

(51) Int. Cl.
G02F 1/1339  (2006.01)
G02F 1/1335  (2006.01)
G02F 1/1333  (2006.01)

(52) U.S. Cl. .................... 349/155; 349/156; 349/114; 349/106; 349/138

(58) Field of Classification Search ................ 349/156, 349/107, 114
See application file for complete search history.

(56) References Cited

U.S. PATENT DOCUMENTS

| 6,195,140 B1 | 2/2001 | Kubo et al. ................. 349/44 |
| 2001/0033358 A1* | 10/2001 | Matsumoto ................ 349/160 |
| 2002/0003596 A1* | 1/2002 | Kim ......................... 349/106 |
| 2002/0075441 A1* | 6/2002 | Fujimori et al. ........... 349/155 |
| 2003/0117551 A1* | 6/2003 | Fujimori et al. ........... 349/113 |

* cited by examiner

*Primary Examiner*—Andrew Schechter
*Assistant Examiner*—W. Patty Chen
(74) *Attorney, Agent, or Firm*—Morgan, Lewis & Bockius, LLP

(57) ABSTRACT

A color filter substrate for a transflective liquid crystal display device includes a substrate having a plurality of pixel regions, each of the plurality of pixel regions having reflective and transmissive portions, a black matrix on the substrate, a buffer layer on the black matrix having a first open portion corresponding to the transmissive portion of the pixel region and a patterned spacer within the reflective portion of the pixel region, a color filter layer on the buffer layer, the color filter layer having a first thickness within the reflective portion of the pixel region and a second thickness within the transmissive portion of the pixel region, and a common electrode on the color filter layer, wherein the buffer layer and the patterned spacer are a single body.

26 Claims, 13 Drawing Sheets

TRANSFLECTIVE LIQUID CRYSTAL DISPLAY DEVICE COMPRISING A PATTERNED SPACER WHEREIN THE BUFFER LAYER AND THE SPACER ARE A SINGLE BODY AND METHOD OF FABRICATING THE SAME

The present invention claims the benefit of Korean Patent Application No. 2002-88298, filed in Korea on Dec. 31, 2002, which is hereby incorporated by reference.

BACKGROUND OF THE INVENTION

1. Field of the Invention

The present invention relates to a liquid crystal display device and a method of fabricating a liquid crystal display device, and more particularly, to a transflective liquid crystal display device and method of fabricating a transflective liquid crystal display device.

2. Discussion of the Related Art

In general, transflective liquid crystal display (LCD) devices function as both transmissive and reflective LCD devices. Accordingly, since the transflective LCD devices can use both a backlight and an exterior natural or artificial light, the transflective LCD devices are usable in more different type of devices, wherein power consumption of transflective LCD devices can be reduced.

FIG. 1 is a schematic plan view of an array substrate for a transflective liquid crystal display device according to the related art. In FIG. 1, a gate line 52 and a data line 62 are formed on a substrate 50, wherein the gate line 52 and the data line 62 cross each other to define a pixel region P. A thin film transistor (TFT) T, which includes a gate electrode 54, an active layer 56, and source and drain electrodes 58 and 60, is disposed at a crossing of the gate line 52 and the data line 62. In addition, the pixel region P includes a reflective portion C and a transmissive portion D, wherein a reflective electrode 64 and a transparent electrode 66 correspond to the reflective portion C and the transmissive portion D, respectively. The reflective electrode 64 having a transmissive hole 64a is formed over the transparent electrode 66, and a metal pattern 65 having an island shape overlaps a portion of the gate line 52 and contacts the reflective electrode 64 or the transparent electrode 66. Accordingly, the metal pattern 65 and the overlapped portion of the gate line 52 constitute a storage capacitor $C_{ST}$.

FIG. 2 is a schematic cross sectional view along I—I of FIG. 1 according to a first embodiment of the related art, and FIG. 3 is a schematic cross sectional view along I—I of FIG. 1 according to a second embodiment of the related art. In FIGS. 2 and 3, first and second substrates 50 and 80 face each other and are spaced apart from each other, wherein the first and second substrates 50 and 80 include a plurality of pixel regions P and a gate line (not shown) and a data 62 line crossing each other are formed on an inner surface of the first substrate 50. In addition, a red sub-color filter 84a, a green sub-color filter 84b, and a blue sub-color filter (not shown) are formed on an inner surface of the second substrate 80, and a black matrix 82 is formed between the sub-color filters 84a and 84b. A transparent common electrode 86 is formed on the sub-color filters 84a and 84b and the black matrix 82, wherein the pixel region P includes a reflective portion C and a transmissive portion D. Generally, a reflective electrode 64 corresponding to the reflective portion C and a transparent electrode 66 corresponding to the transmissive portion D are formed over an inner surface of the first substrate 50. The reflective electrode 64 has a transmissive hole 64a formed over or under the transparent electrode 66.

In the transflective LCD device, it is necessary to obtain an equivalent optical efficiency in the reflective and transmissive portions C and D. In FIG. 2, since the light path (i.e., the distance that light transverses when light passes through a liquid crystal layer) in the reflective portion C is different from that in the transmissive portion D, the polarization properties in the reflective and transmissive portions C and D are also different from each other. When light passes through a liquid crystal layer 90 having a thickness d within the transmissive portion D, light passing through the liquid crystal layer 90 in the reflective portion C is reflected at the reflective electrode 64 and then passes through the liquid crystal layer 90 again. Accordingly, light path in the reflective portion C is twice of that within the transmissive portion D. Thus, light has different polarization properties in the reflective and transmissive portions C and D, thereby a difference in light efficiency is generated.

To solve this problem, as shown in FIG. 3, an insulating layer 63 within the transmissive portion D has an open portion 61 so that light path in the reflective portion C can be the same as that in the transmissive portion D. When the liquid crystal layer 90 in the reflective portion C has a first thickness of d, the liquid crystal layer 90 in the transmissive portion D has a second thickness of 2d. In other words, the liquid crystal layer 90 has a dual cell gap.

However, even though light efficiency of the reflective portion C is the same as that of the transmissive portion D due to the dual cell gap, uniform color reproducibility cannot be obtained. The sub-color filters 84a and 84b within the reflective portion C have the same thickness as that in the transmissive portion D. Light passes through the sub-color filters 84a and 84b twice within the reflective portion C, whereas light passes through the sub-color filters 84a and 84b just once in the transmissive portion D. Accordingly, even though light passing through the transmissive portion D is brighter than light reflected from the reflective portion C, light emitted from the reflective portion C has higher color reproducibility than that emitted from the transmissive portion D. To solve this problem, a method that a sub-color filter having a dual thickness in the reflective and transmissive portions is disclosed in Korean Patent Application No. 2000-9979.

FIG. 4 is a schematic cross sectional view along I—I of FIG. 1 according to a third embodiment of the related art. In FIG. 4, first and second substrates 50 and 80 having a pixel region P face each other and are spaced apart from each other, and a liquid crystal layer 90 is interposed therebetween. The pixel region P includes a reflective portion C and a transmissive portion D, wherein a black matrix 92 is formed on an inner surface of the second substrate 80 at a border of the pixel region P. A transparent buffer layer 94 corresponding to the reflective portion C is formed on the black matrix 82, and red and green sub-color filters 96a and 96b are formed on the buffer layer 94 in the pixel region P. A planarization layer 97 and a common electrode 98 are sequentially formed on the red and green sub-color filters 96a and 96b.

A reflective electrode 64 corresponding to the reflective portion C and a transparent electrode 66 corresponding to the transmissive portion D are formed on an inner surface of the first substrate 50. Generally, the reflective electrode 64 has a transmissive hole 64a formed under the transparent electrode 66. Since an insulating layer 63 under the reflective electrode 64 has an open portion 61 corresponding to the transmissive hole 64a, a first thickness d1 of the liquid crystal layer 90 within the reflective portion C is one-half of a second thickness d2 of the liquid crystal layer 90 within the transmissive portion D. That is, the second thickness d2 of the liquid crystal layer 90 within the transmissive portion D is substantially twice of the first thickness d1 of the liquid crystal layer 90 within the reflective portion C. Each of the sub-color filters 96a and 96b has a thickness ratio of 1:2 within the reflective and transmissive portions C and D due to the buffer layer 94.

FIGS. 5A to 5F are schematic cross sectional views of a fabrication process of a color filter layer according to the related art. In FIG. 5A, a black matrix 92 is formed on a substrate 80 by sequentially depositing and patterning chromium oxide (CrOx) and chromium (Cr), wherein the black matrix 92 is provided for low reflectance of an LCD screen. Since an aperture ratio is directly dependent on a shape of the black matrix 92, the black matrix 92 is formed to cover only a portion corresponding to a switching element (not shown), a gate line (not shown), and a data line (not shown) in order to prevent light leakage due to reflected light and an assembly margin of an attachment process for the upper and lower substrates. As a result, a portion of the color filter substrate within a pixel region is exposed.

In FIG. 5B, a transparent thin film 93 is formed on the black matrix 92 by depositing one of a photopolymeric polymer, an organic insulating material, and an inorganic insulating material.

In FIG. 5C, a buffer layer 94 is formed at a portion corresponding to the reflective portion C through photolithographic processes to eliminate the transparent thin film 93 (in FIG. 5A) corresponding to the transmissive portion D. As a result, the buffer layer 94 is formed on a second substrate 80 corresponding to the reflective portion C.

In FIG. 5D, a red sub-color filter 96a is formed on the buffer layer 94 by coating and patterning color resin including red dye. Since the color resin fills a portion corresponding to the transmissive portion D where the buffer layer 94 is not formed, the red sub-color filter 96a is formed to correspond to one pixel region P including the reflective and transmissive portions C and D.

In FIG. 5E, similar to the red sub-color filter 96a, a green sub-color filter 96b is formed on the buffer layer 94 by coating and patterning color resin including green dye.

In FIG. 5F, similar to the red and green sub-color filters 96a and 96b, a blue sub-color filter 96c is formed on the buffer layer 94 by coating and patterning color resin including blue dye. Accordingly, a color filter layer 96 including red, green, and blue sub-color filters 96a, 96b, and 96c may be formed. In addition, a common electrode 98 is formed on the color filter layer 96 by depositing one of a transparent conductive metallic material group including indium-tin-oxide (ITO) and indium-zinc-oxide (IZO). A planarization layer (not shown) may be formed between the color filter layer 96 and the common electrode 98.

In the transflective LCD devices of FIGS. 2, 3, and 4, ball spacers may be used to maintain a cell gap. Generally, since the ball spacers are randomly spread out between first and second substrates, an inferior alignment layer may be formed due to movement of the ball spacers. Moreover, a light leakage phenomenon may occur at portions adjacent to the ball spacers due to adsorption forces between liquid crystal molecules adjacent to the ball spacers. In addition, since the ball spacers may be formed through an additional process, production costs increase. Accordingly, superior display quality can not be obtained in the transflective LCD device using the ball spacers.

SUMMARY OF THE INVENTION

Accordingly, the present invention is directed to a liquid crystal display device that substantially obviates one or more of the problems due to limitations and disadvantages of the related art.

An object of the present invention is to provide a transflective liquid crystal display device having patterned spacers.

Another object of the present invention is to provide a method of fabricating a transflective liquid crystal display device having patterned spacers.

Another object of the present invention is to provide a transflective liquid crystal display device having patterned spacers simultaneously formed with a buffer layer for a dual color filter layer.

Another object of the present invention is to provide a method of fabricating a transflective liquid crystal display device having patterned spacers simultaneously formed with a buffer layer for a dual color filter layer.

Another object of the present invention is to provide a method of fabricating a transflective liquid crystal display device having simplified fabricating processes.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a color filter substrate for a transflective liquid crystal display device includes a substrate having a plurality of pixel regions, each of the plurality of pixel regions having reflective and transmissive portions, a black matrix on the substrate, a buffer layer on the black matrix having a first open portion corresponding to the transmissive portion of the pixel region and a patterned spacer within the reflective portion of the pixel region, a color filter layer on the buffer layer, the color filter layer having a first thickness within the reflective portion of the pixel region and a second thickness within the transmissive portion of the pixel region, and a common electrode on the color filter layer, wherein the buffer layer and the patterned spacer are a single body.

In another aspect, a method of fabricating a color filter substrate for a transflective liquid crystal display device includes forming a black matrix on a substrate having a plurality of pixel regions, each of the plurality of pixel regions having reflective and transmissive portions, forming a buffer layer on the black matrix, the buffer layer having a first open portion corresponding to the transmissive portion of the pixel region and a patterned spacer within the reflective portion of the pixel region, forming a color filter layer on the buffer layer, the color filter layer having a first thickness within the reflective portion of the pixel region and a second thickness within the transmissive portion of the pixel region, and forming a common electrode on the color filter layer.

In another aspect, a transflective liquid crystal display device includes first and second substrates facing each other and spaced apart from each other, a gate line on an inner surface of the first substrate, a data line crossing the gate line to define a pixel region having reflective and transmissive portions, a thin film transistor connected to the gate line and the data line, a passivation layer on the thin film transistor, the gate line, and the data line, wherein the passivation layer has a groove corresponding to the transmissive portion of the pixel region, a reflective layer within the reflective portion of the pixel region, a transparent electrode within the transmissive portion of the pixel region, wherein the transparent electrode is connected to the thin film transistor, a black matrix on an inner surface of the second substrate, a buffer layer on the black matrix, the buffer layer having a first open portion corresponding to the transmissive portion of the pixel region and a patterned spacer with in the reflective portion of the pixel region, a color filter layer on the buffer layer, the color filter layer having a first thickness within the reflective portion of the pixel region and a second thickness within the transmissive portion of the pixel region, a common electrode on the color filter layer, and a liquid crystal layer interposed between the transparent electrode and the common electrode, wherein the buffer layer and the patterned spacer are a single body.

In another aspect, a transflective liquid crystal display device includes first and second substrates facing each other and spaced apart from each other, a gate line on an inner surface of the first substrate, a data line crossing the gate line to define a pixel region having reflective and transmissive portions, a thin film transistor connected to the gate line and the data line, a reflective layer within the reflective portion of the pixel region, a transparent electrode within the transmissive portion of the pixel region, the transparent electrode being connected to the thin film transistor, a black matrix on an inner surface of the second substrate, a buffer layer on the black matrix, the buffer layer having a first open portion corresponding to the transmissive portion of the pixel region and a patterned spacer within the reflective portion of the pixel region, a color filter layer on the buffer layer, the color filter layer having a first thickness within the reflective portion of the pixel region and a second thickness within the transmissive portion of the pixel region, a common electrode on the color filter layer, and a liquid crystal layer interposed between the transparent electrode and the common electrode, wherein the buffer layer and the patterned spacer are one single body.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, an example of which is illustrated in the accompanying drawings.

Figure 1:
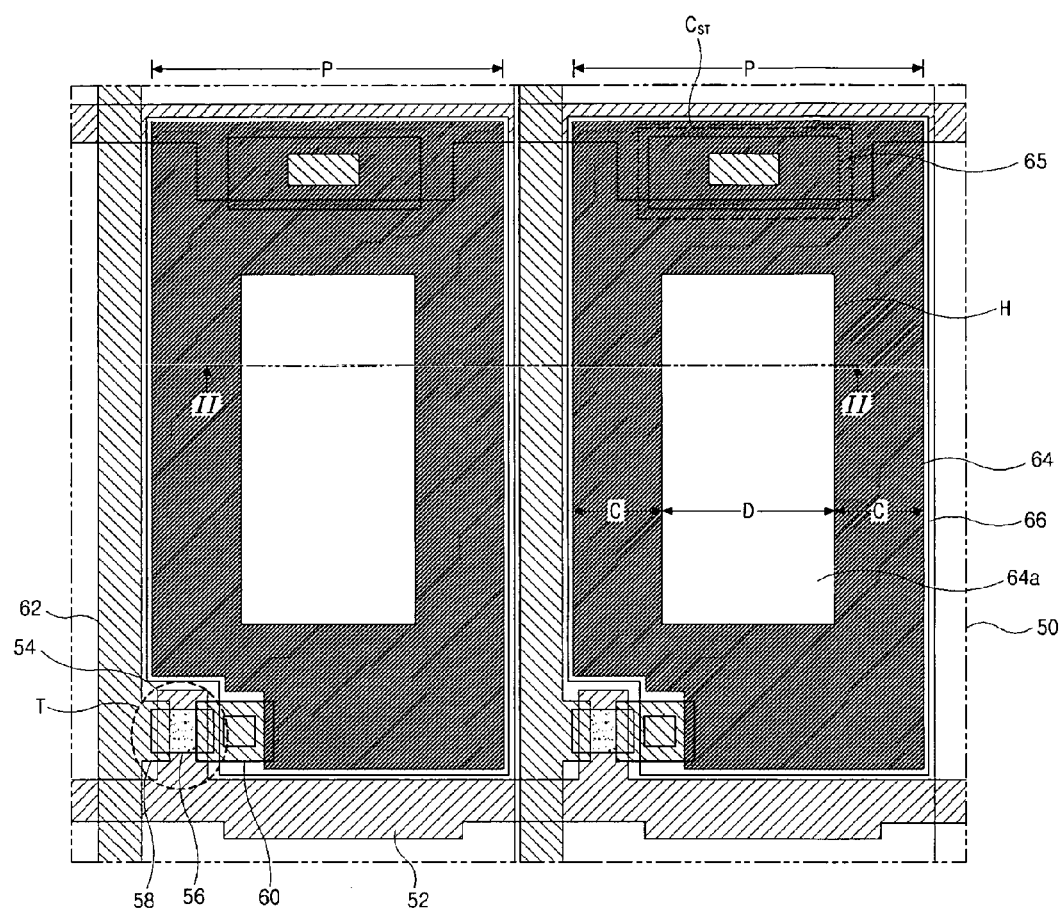
FIG. 1 is a schematic plan view of an array substrate for a transflective liquid crystal display device according to the related art.
Figure 2:
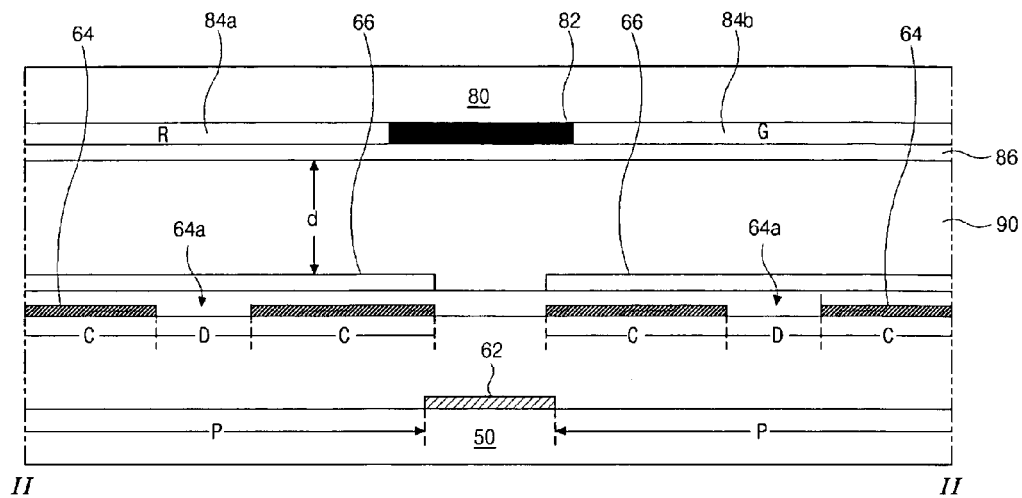
FIG. 2 is a schematic cross sectional view along I—I of FIG. 1 according to a first embodiment of the related art.
Figure 3:
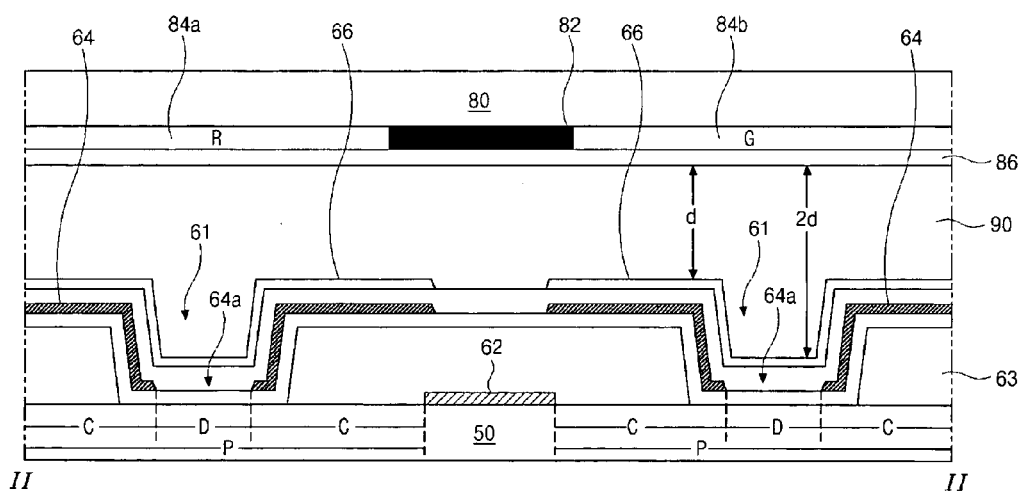
FIG. 3 is a schematic cross sectional view along I—I of FIG. 1 according to a second embodiment of the related art.
Figure 4:
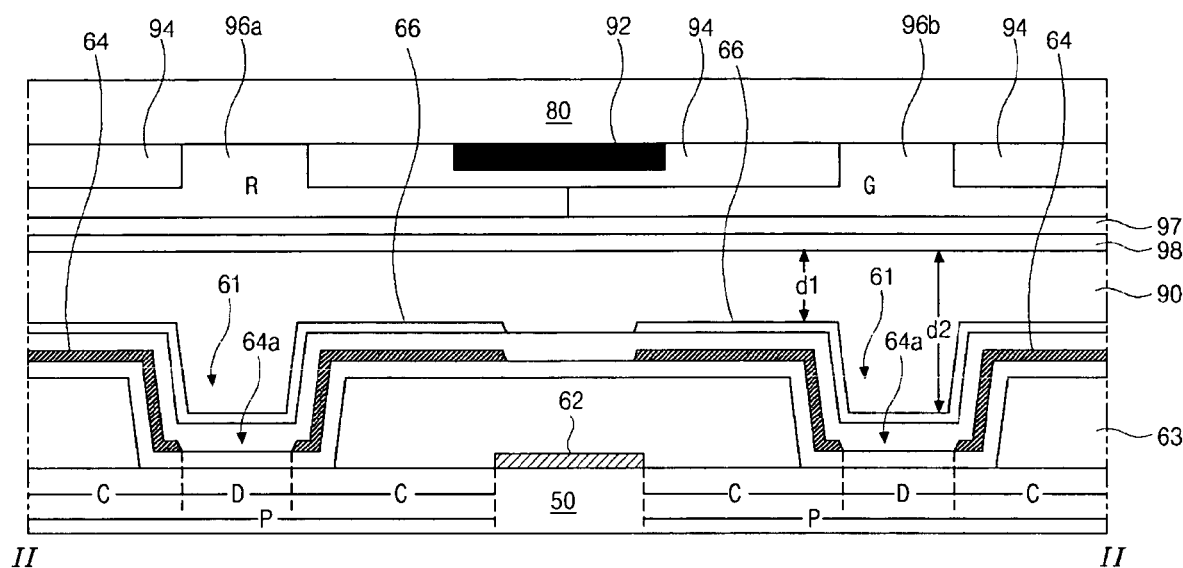
FIG. 4 is a schematic cross sectional view along I—I of FIG. 1 according to a third embodiment of the related art.
Figure 5A:
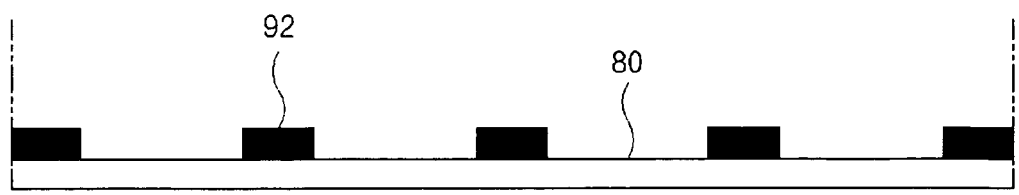
FIGS. 5A to 5F are schematic cross sectional views of a fabrication process of a color filter layer according to the related art.
Figure 5B:
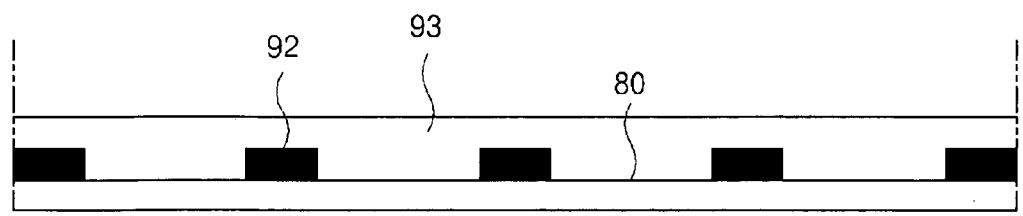
Figure 5C:
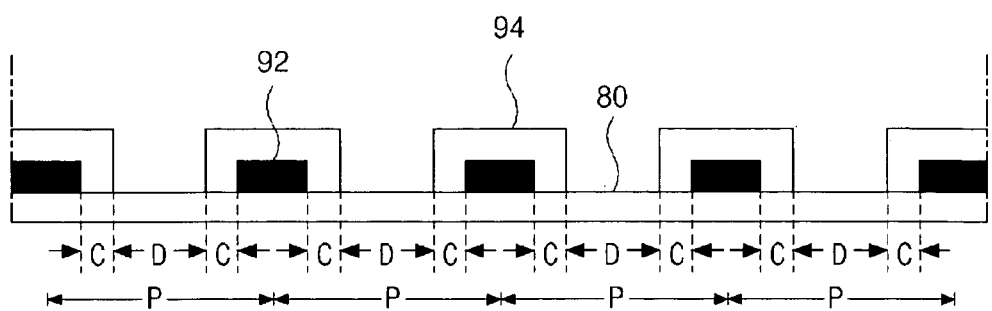
Figure 5D:
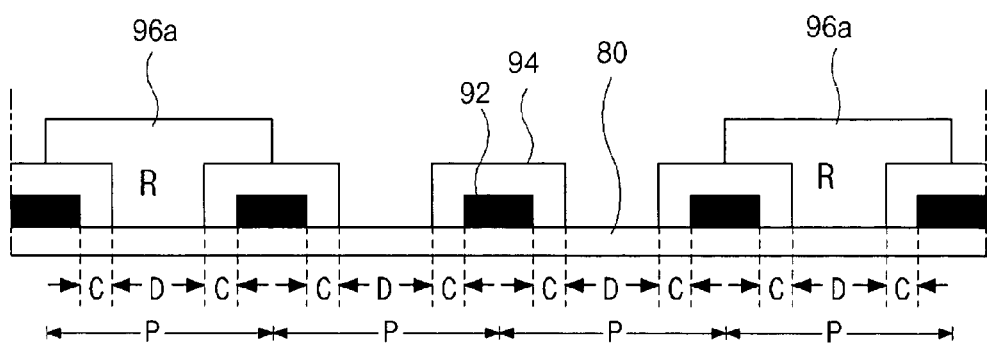
Figure 5E:
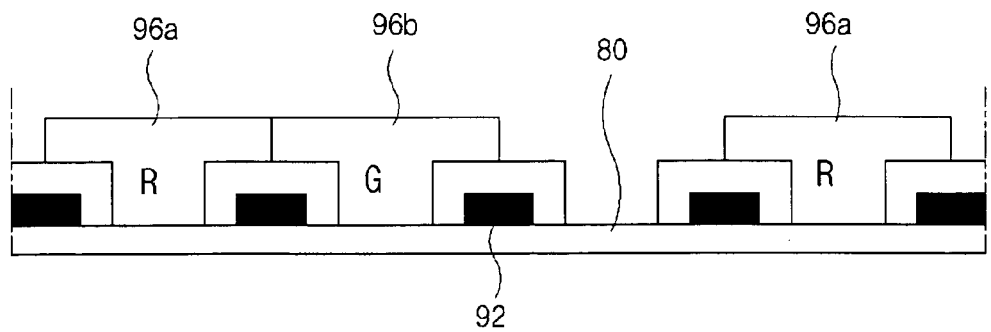
Figure 5F:
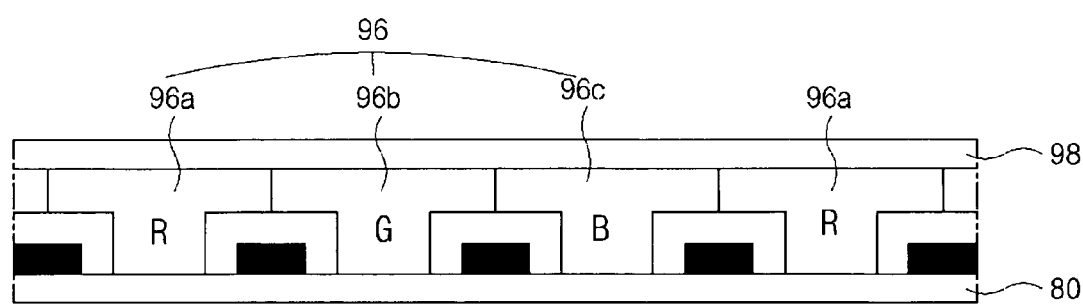
Figure 6:
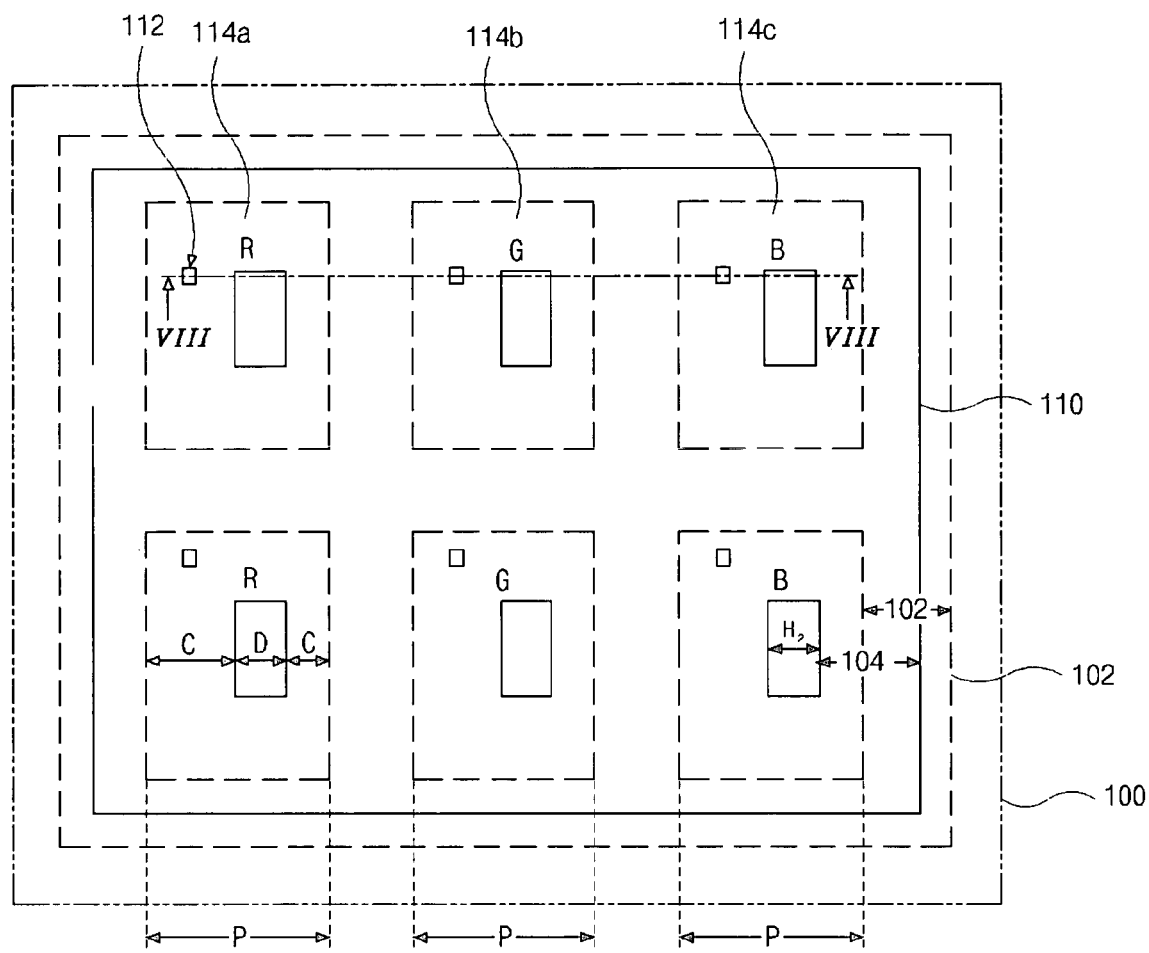
FIG. 6 is a schematic plan view of an exemplary color filter substrate for a transflective liquid crystal display device according to the present invention.
Figure 7:
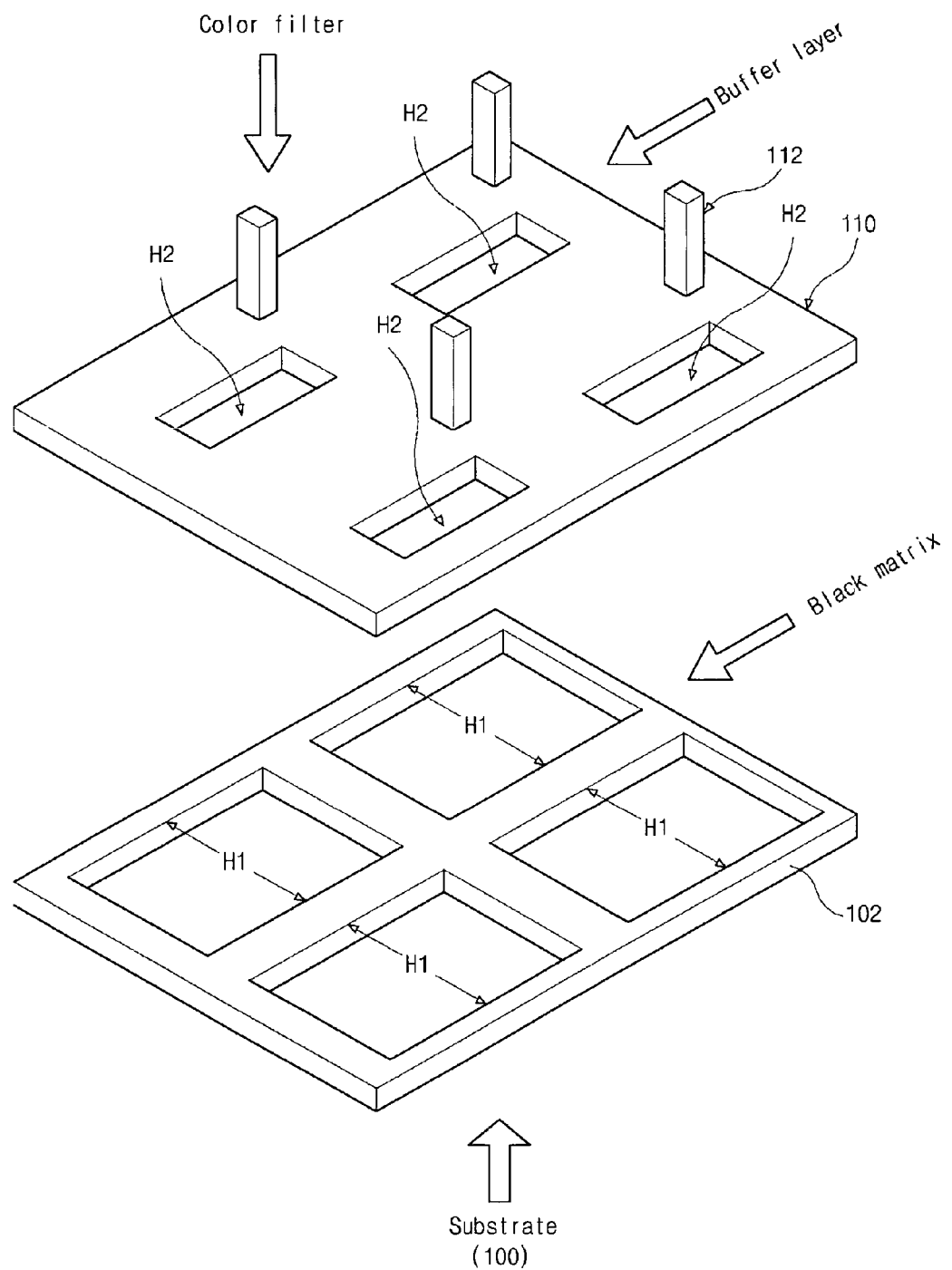
FIG. 7 is a schematic perspective view of an exemplary black matrix and buffer layer of a color filter substrate for a transflective liquid crystal display device according to the present invention.

FIG. 6 is a schematic plan view of an exemplary color filter substrate for a transflective liquid crystal display device according to the present invention, and FIG. 7 is a schematic perspective view of an exemplary black matrix and buffer layer of a color filter substrate for a transflective liquid crystal display device according to the present invention. In FIGS. 6 and 7, a black matrix 102 having a plurality of first open portions H1 may be formed on a substrate 100, wherein the substrate 100 may have a plurality of pixel regions P and each of the pixel regions P may include reflective and transmissive portions C and D. The plurality of first open portions H1 may correspond to the plurality of pixel regions P. A buffer layer 110 having a plurality of second open portions H2 may be formed on the black matrix 102, wherein the plurality of second open portions H2 may correspond to the transmissive portion D. In addition, the buffer layer 110 may include a plurality of patterned spacers 112 corresponding to the reflective portion C. The plurality of patterned spacers 112 may be simultaneously formed with the buffer layer 110 as a single body. Although not shown, a color filter layer may be formed on the buffer layer 110 using a spin coating method to fill the transmissive portion D.

FIGS. 8A to 8E are schematic cross sectional views along VIII—VIII of FIG. 6 of an exemplary method of fabricating a color filter substrate for a transflective liquid crystal display device according to the present invention. In FIGS. 8A to 8E, each sub-color filter may extend along a vertical direction. Accordingly, red, green, and blue sub-color filters may extend along a vertical direction and may be alternately disposed along a horizontal direction.

Figure 8A:
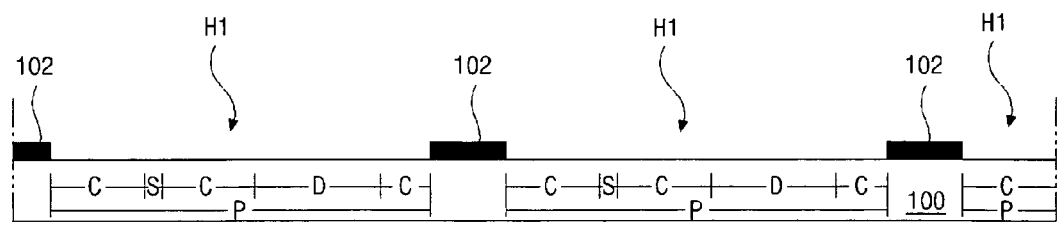
FIGS. 8A to 8E are schematic cross sectional views along VIII—VIII of FIG. 6 of an exemplary method of fabricating a color filter substrate for a transflective liquid crystal display device according to the present invention.

In FIG. 8A, a black matrix 102 having a plurality of first open portions H1 may be formed on a substrate 100, wherein the substrate 100 may have a plurality of pixel regions P and each of the pixel regions P may include reflective portions C, a transmissive portions D, and a spacer portion S adjacent to the reflective portion C. The plurality of first open portions H1 correspond to the plurality of pixel regions P, and a black matrix 102 may be formed of a single layer of chromium (Cr) or a double layer of chromium/chromium oxide (Cr/CrOx) having low reflectance.

Figure 8B:
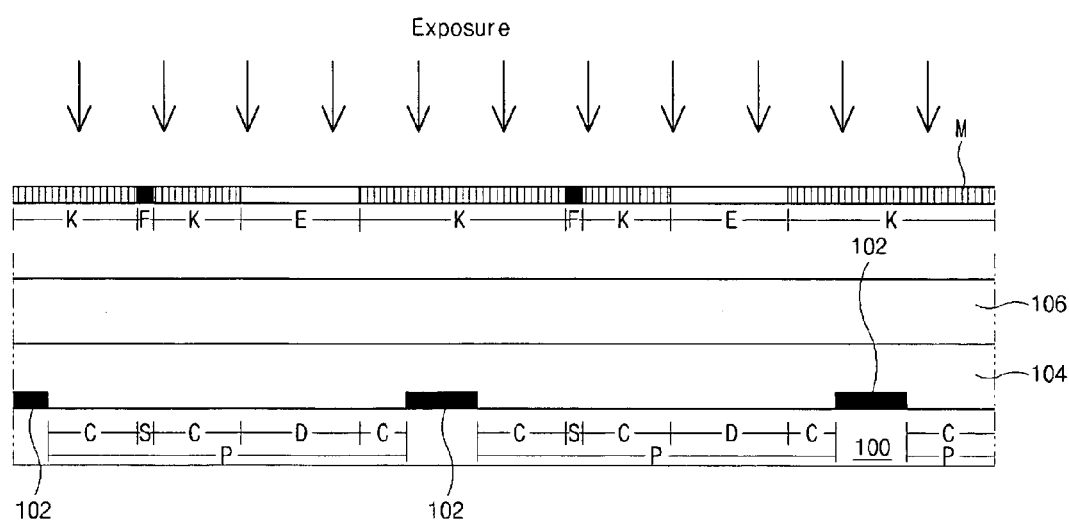

In FIG. 8B, a transparent insulating layer 104 may be formed on the black matrix 102 by coating one of a transparent organic insulating material group, for example, benzocyclobutene (BCB) and acrylic resin. In addition, a photoresist (PR) layer 106 may be formed on the transparent insulating layer 104, wherein a mask M having transmissive regions E, shielding regions F, and half-transmissive regions K may be disposed over the PR layer 106, wherein the half-transmissive regions K may be formed of a slit or a half-transmissive layer. The transmissive regions E, the shielding regions F, and the half-transmissive regions K may correspond to the transmissive portions D, the spacer portions S and the reflective portions C, respectively. After disposing the mask M over the PR layer 106, the PR layer 106 may be exposed to light through the mask M, and then developed.

Figure 8C:
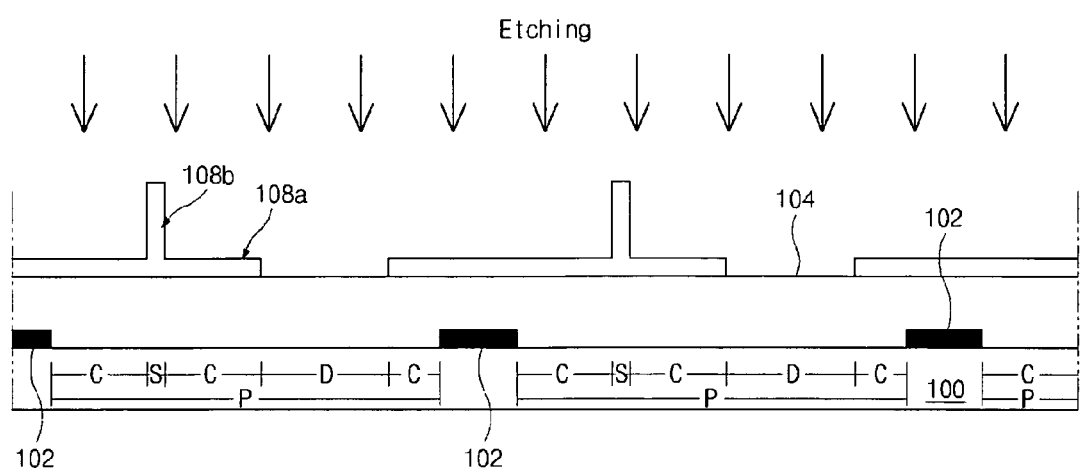

In FIG. 8C, after developing the PR layer 106, first and second PR patterns 108a and 108b corresponding to the reflective portions C and the spacer portions S, respectively, may be obtained. The first PR pattern 108a may have a thickness lower than a thickness of the PR layer 106 (in FIG. 8B), and the second PR pattern 108b may have a same thickness as the PR layer 106 (in FIG. 8B). The transparent insulating layer 104 within the transmissive portions D may be exposed to the light since the entire PR layer 106 (in FIG. 8B) within the transmissive portion D may be removed through the exposure and developing steps.

The first and second PR patterns 108a and 108b and the transparent insulating layer 104 may be etched until the second PR pattern 108b is removed. For example, while the transparent insulating layer 104 is etched, the first and second PR patterns 108a and 108b may be also etched through a dry etching method.

Figure 8D:
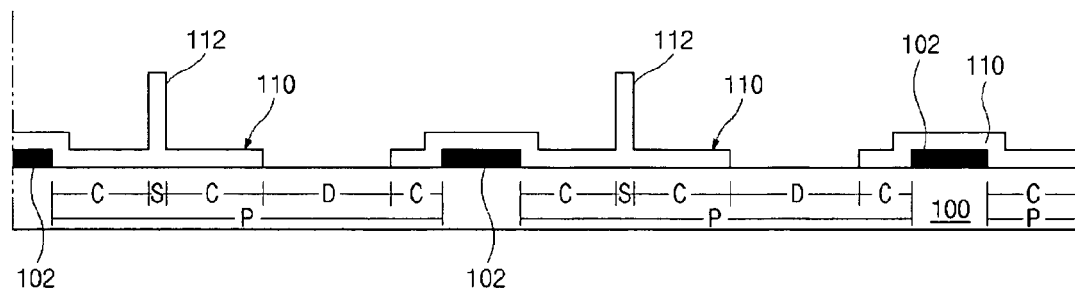

In FIG. 8D, after etching the first and second PR patterns 108a and 108b (in FIG. 8C) and the transparent insulating layer 104 (in FIG. 8C), a plurality of buffer layers 110 corresponding to the reflective portions C and patterned spacers 112 corresponding to the spacer portions S may be obtained. Each of the buffer layers 110 may have a thickness lower than a thickness of the patterned spacers 112, and the patterned spacers 112 may have a columnar shape. Portions of the substrate 100 within the transmissive portion D may be exposed since the entire transparent insulating layer 104 (in FIG. 8C) may be removed.

Figure 8E:
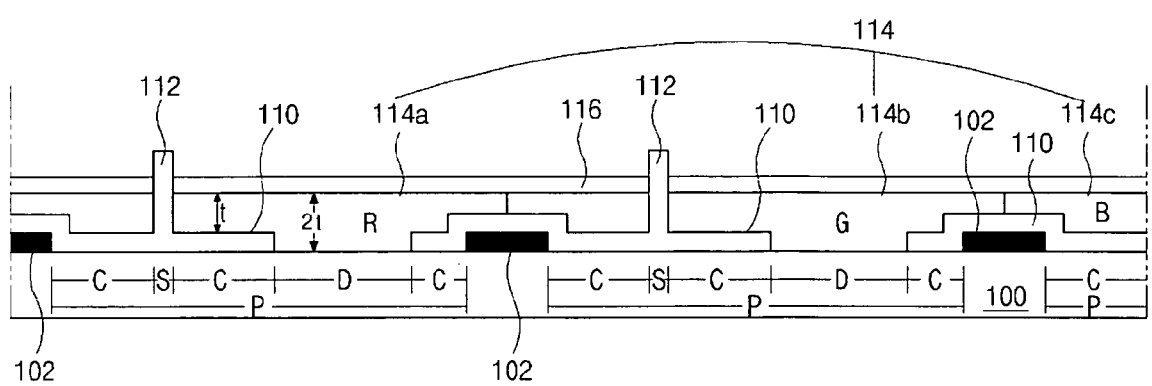

In FIG. 8E, a color filter layer 114 including red, green, and blue sub-color filters 114a, 114b, and 114c may be formed on the buffer layers 110. The red, green, and blue sub-color filters 114a, 114b, and 114c, each of which may correspond to the pixel regions P, may be sequentially formed through coating and patterning steps. Each of the red, green, and blue sub-color filters 114a, 114b, and 114c may be formed to have a first thickness t within the reflective portion C and a second thickness 2t that may be about twice the first thickness t within the transmissive portion D due to the buffer layers 110. In addition, a common electrode 116 may be formed on the color filter layer 114, and may be formed of a transparent conductive metal, such as indium-tin-oxide (ITO) and indium-zinc-oxide (IZO).

Figure 9:
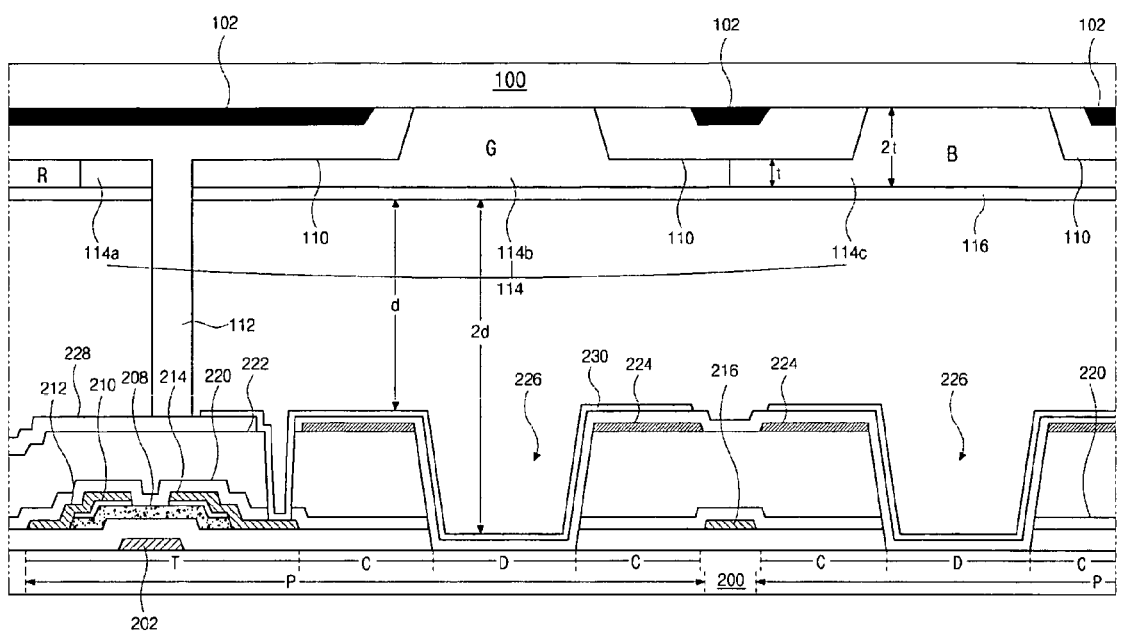
FIG. 9 is a schematic cross sectional view of an exemplary transflective liquid crystal display device according to the present invention.

FIG. 9 is a schematic cross sectional view of an exemplary transflective liquid crystal display device according to the present invention. In FIG. 9, first and second substrates 200 and 100 may face each other and may be spaced apart from each other, wherein the first and second substrates 200 and 100 may have a plurality of pixel regions P and each of the pixel regions P may include reflective and transmissive portions C and D. A thin film transistor (TFT) T, which may include a gate electrode 202, an active layer 208, an ohmic contact layer 210, and source and drain electrodes 212 and 214, may be formed on an inner surface of the first substrate 200. A gate line (not shown) and a data line 216 that cross each other may be formed over the inner surface of the first substrate 200. Accordingly, one of the pixel regions P may be defined by the crossing of the gate line (not shown) and the data line 216, wherein the data line 216 may be connected to the source electrode 212.

In FIG. 9, a first insulating layer 220 of an inorganic material and a second insulating layer 222 of an organic material having a groove 226 corresponding to the transmissive portion D may be formed on the TFT T and the data line 216 through sequential depositing and patterning steps. In addition, a reflective layer 224 having an open portion corresponding to the transmissive portion D may be formed on the second insulating layer 222, a third insulating layer 228 may be formed on the reflective layer 224, and a transparent electrode 230 corresponding to the pixel region P may be formed on the third insulating layer 228.

In FIG. 9, a black matrix 102 may be formed on an inner surface of the second substrate 100, and may include a plurality of first open portions H1 (in FIG. 8A) corresponding to the plurality of pixel regions P and a portion of the black matrix 102 may correspond to the TFT T. In addition, a transparent buffer layer 110 may be formed on the black matrix 102, wherein the buffer layer 110 may include a plurality of second open portions H2 (in FIG. 7) within the transmissive portion D and a patterned spacer 112 corresponding to the reflective portion C. The patterned spacer 112 may be simultaneously formed with the buffer layer 110 as a single body.

In FIG. 9, a color filter layer 114 including red, green, and blue sub-color filters 114a, 114b, and 114c may be formed on the buffer layer 110. Each of the red, green, and blue sub-color filters 114a, 114b, and 114c may correspond to one of the pixel regions P. Due to the buffer layer 110, the color filter layer 114 may have a first thickness t within the reflective portion C and a second thickness 2t within the transmissive portion D. For example, the first thickness t may be substantially one-half of the second thickness 2t. Since the first and second insulating layers 220 and 222 may have the grooves 226 corresponding to the transmissive portions D, the transflective LCD device may have a first cell gap d within the reflective portions C and a second cell gap 2d within the transmissive portions D, wherein the first cell gap d may be substantially one-half of the second cell gap 2d.

According to the present invention, the first and second insulating layers 220 and 222 of the first substrate 200 may be patterned to have the grooves 226 for a dual cell gap of the first and second cell gaps d and 2d. Thus, in order to obtain a cell gap ratio of 1:2 in the reflective and transmissive portions C and D, the organic material for the second insulating layer 222 may be deposited to have a sufficient thickness, and then may be patterned. Accordingly, a cell gap ratio between the reflective and transmissive portions C and D may be obtained by adjusting the thickness of the second organic insulating layer 222.

Figure 10:
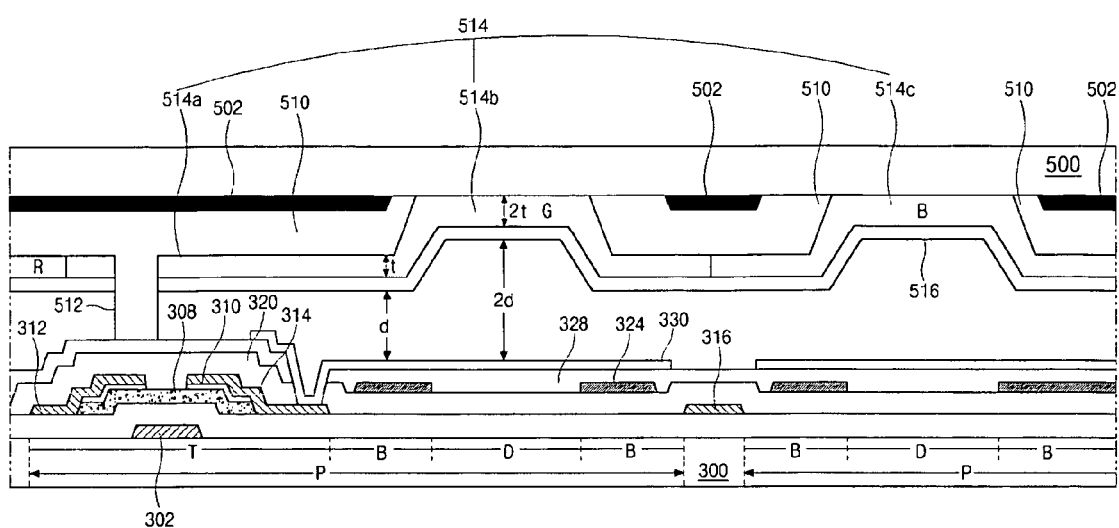
FIG. 10 is a schematic cross sectional view of another exemplary transflective liquid crystal display device according to the present invention.

FIG. 10 is a schematic cross sectional view of another exemplary transflective liquid crystal display device according to the present invention. In FIG. 10, first and second substrates 300 and 500 may face each other and may be spaced apart from each other, wherein the first and second substrates 300 and 500 may have a plurality of pixel regions P and each of the pixel regions P may include reflective and transmissive portions C and D. A thin film transistor (TFT) T, which may include a gate electrode 302, an active layer 308, an ohmic contact layer 310, and source and drain electrodes 312 and 314, amy be formed on an inner surface of the first substrate 300. A gate line (not shown) and a data line 316 may be formed over the inner surface of the first substrate 300 to cross each other. One of the pixel regions P may be defined by the crossing of the gate line (not shown) and the data line 316, wherein the data line 316 may be connected to the source electrode 312. In addition, a first insulating layer 320 may be formed on the TFT T, and the data line 316 and a reflective layer 324 may be formed on the first insulating layer 320, wherein the reflective layer 324 may include an open portion 324a that corresponds to the transmissive portion D. A second insulating layer 328 may be formed on the reflective layer 324 and a transparent electrode 330 corresponding to the pixel regions P may be formed on the second insulating layer 328.

In FIG. 10, a black matrix 502 may be formed on an inner surface of the second substrate 500, wherein the black matrix 502 may have a plurality of first open portions H1 (in FIG. 8A) that correspond to the plurality of pixel regions P and a portion of the black matrix 502 may correspond to the TFT T. In addition, a transparent buffer layer 510 may be formed on the black matrix 502 and may include a plurality of second open portions H2 (in FIG. 7) within the transmissive portion D and a patterned spacer 512 corresponding to the reflective portion C. The patterned spacer 512 may be simultaneously formed with the buffer layer 510 as a single body. A color filter layer 514 including red, green, and blue sub-color filters 514a, 514b, and 514c may be formed on the buffer layer 510, wherein each of the red, green, and blue sub-color filters 514a, 514b, and 514c may correspond to one of the pixel regions P.

Due to the buffer layer 510, the color filter layer 514 may have a first thickness t within the reflective portion C and a second thickness 2t within the transmissive portion D. For example, the first thickness t may be substantially one-half of the second thickness 2t. Accordingly, the color filter layer 514 may have a step difference along a border of the reflective and transmissive portions C and D so that the transflective LCD device can have a first cell gap d within the reflective portion C and a second cell gap 2d within the transmissive portion D. Thus, the first cell gap d may be substantially one-half of the second cell gap 2d. For example, when the buffer layer 510 is formed to have a thickness of about 2.5 µm to about 4.0 µm, top surfaces of the color filter layer 514 within the reflective and transmissive portions C and D may have a step difference of about 2.0 µm to about 2.5 µm. Accordingly, a distance from the inner surface of the second substrate 500 to the top surface of the color filter layer 514 within the reflective portion C may be greater than a distance from the inner surface of the second substrate 500 to the top surface of the color filter layer 514 within the transmissive portion D by about 2.0 µm to about 2.5 µm.

According to the present invention, a cell gap ratio of the transflective LCD device, as well as a thickness ratio of the color filter layer 514, between the reflective and transmissive portions C and D may be adjusted due to the step difference of the buffer layer 510. Accordingly, an additional step of forming a groove in an insulating layer on the first substrate may be omitted, thereby simplifying fabricating processes.

According to the present invention, since the transflective LCD device may have a cell gap ratio of 1:2 and a thickness ratio of the color filter layer within the reflective and transmissive portions may be 1:2, an equivalent optical efficiency and an equivalent color reproducibility may be obtained within the reflective and transmissive portions. Accordingly, the transflective LCD device having high brightness and superior display quality may be obtained. Moreover, since patterned spacers may be simultaneously formed with the buffer layer, production yield may be improved through process simplification.

It will be apparent to those skilled in the art that various modifications and variations can be made in a transflective liquid crystal display device and method of fabricating the same of the present invention without departing from the spirit or scope of the invention. Thus, it is intended that the present invention cover the modifications and variations of this invention provided they come within the scope of the appended claims and their equivalents.

What is claimed is:

1. A color filter substrate for a transflective liquid crystal display device, comprising:
    a substrate having a plurality of pixel regions, each of the plurality of pixel regions having reflective, transmissive, and black matrix portions;
    a black matrix on the substrate;
    a buffer layer on the black matrix having a first open portion corresponding to the transmissive portion of the pixel region and a patterned spacer within the black matrix portion of the pixel region;
    a color filter layer on the buffer layer, the color filter layer having a first thickness within the reflective portion of the pixel region and a second thickness within the transmissive portion of the pixel region; and
    a common electrode on the color filter layer,
    wherein the buffer layer and the patterned spacer are a single body with the patterned spacer protruding from the buffer layer through the color filter layer and the common electrode.

2. The color filter substrate according to claim 1, wherein the first thickness is substantially one-half of the second thickness.

3. The color filter substrate according to claim 1, wherein the buffer layer includes one of a transparent organic insulating material group including benzocyclobutene (BCB) and acrylic resin.

4. The color filter substrate according to claim 1, wherein the color filter layer has a step difference along a border between the reflective and transmissive portions of the pixel region.

5. The color filter substrate according to claim 4, wherein the buffer layer has a thickness within a range of about 2.5 µm to about 4.0 µm.

6. The color filter substrate according to claim 5, wherein the step difference is within a range of about 2.0 µm to about 2.5 µm.

7. The color filter substrate according to claim 1, wherein the black matrix has a second open portion corresponding to the pixel region.

8. A method of fabricating a color filter substrate for a transflective liquid crystal display device, comprising:
    forming a black matrix on a substrate having a plurality of pixel regions, each of the plurality of pixel regions reflective, transmissive, and black matrix portions;
    forming a buffer layer on the black matrix, the buffer layer having a first open portion corresponding to the transmissive portion of the pixel region and a patterned spacer within the black matrix portion of the pixel region;
    forming a color filter layer on the buffer layer, the color filter layer having a first thickness within the reflective portion of the pixel region and a second thickness within the transmissive portion of the pixel region; and forming a common electrode on the color filter layer,
wherein the buffer layer and the patterned spacer are a single body with the patterned spacer protruding from the buffer layer through the color filter layer and the common electrode.

9. The method according to claim 8, wherein the forming of the buffer layer comprises:
 forming a transparent insulating layer on the black matrix;
 forming a photoresist layer on the transparent insulating layer;
 disposing a mask having a transmissive region, a shielding region, and a half-transmissive region over the photoresist layer, wherein the transmissive region, theshielding region, and the half-transmissive region correspond to the transmissive portion, a spacer portion within the reflective portion, and the reflective portion, respectively, wherein a first transmittance of the transmissive region is greater than a second transmittance of the half-transmissive region and the second transmittance of the half-transmissive region is greater than a third transmittance of the shielding region;
 irradiating the photoresist layer with light through the mask;
 developing the photoresist layer to form a photoresist pattern, wherein the transparent insulating layer within the transmissive layer is exposed through the photoresist pattern; and etching the transparent insulating layer and the photoresist pattern.

10. The method according to claim 9, wherein the photoresist pattern has a first thickness within the reflective portion and a second thickness within the spacer portion greater than the first thickness.

11. The method according to claim 8, wherein the first thickness is substantially one-half of the second thickness.

12. The method according to claim 8, wherein the buffer layer includes one of a transparent organic insulating material group including benzocyclobutene (BCB) and acrylic resin.

13. The method according to claim 8, wherein the color filter layer includes red, green, and blue sub-color filters corresponding to the pixel region.

14. A transflective liquid crystal display device, comprising:
 first and second substrates facing each other and spaced apart from each other;
 a gate line on an inner surface of the first substrate;
 a data line crossing the gate line to define a pixel region having reflective, transmissive, and black matrix portions;
 a thin film transistor connected to the gate line and the data line;
 a passivation layer on the thin film transistor, the gate line, and the data line, wherein the passivation layer has a groove corresponding to the transmissive portion of the pixel region;
 a reflective layer within the reflective portion of the pixel region;
 a transparent electrode within the transmissive portion of the pixel region, wherein the transparent electrode is connected to the thin film transistor;
 a black matrix on an inner surface of the second substrate;
 a buffer layer on the black matrix, the buffer layer having a first open portion corresponding to the transmissive portion of the pixel region and a patterned spacer within the black matrix portion of the pixel region;
 a color filter layer on the buffer layer, the color filter layer having a first thickness within the reflective portion of the pixel region and a second thickness within the transmissive portion of the pixel region;
 a common electrode on the color filter layer; and
 a liquid crystal layer interposed between the transparent electrode and the common electrode,
 wherein the buffer layer and the patterned spacer are a single body with the patterned spacer protruding from the buffer layer through the color filter layer and the common electrode.

15. The device according to claim 14, wherein the patterned spacer contacts a top layer over the first substrate through the liquid crystal layer.

16. The device according to claim 14, wherein the first thickness is substantially one-half of the second thickness.

17. The device according to claim 14, wherein the liquid crystal layer has a third thickness within the reflective portion of the pixel region and a fourth thickness within the transmissive portion of the pixel region, wherein the third thickness is substantially one-half of the fourth thickness.

18. The device according to claim 14, wherein the black matrix has a second open portion corresponding to the pixel region.

19. A transflective liquid crystal display device, comprising:
 first and second substrates facing each other and spaced apart from each other;
 a gate line on an inner surface of the first substrate;
 a data line crossing the gate line to define a pixel reflective, transmissive, and black matrix portions;
 a thin film transistor connected to the gate line and the data line;
 a reflective layer within the reflective portion of the pixel region;
 a transparent electrode within the transmissive portion of the pixel region, the transparent electrode being connected to the thin film transistor;
 a black matrix on an inner surface of the second substrate;
 a buffer layer on the black matrix, the buffer layer having a first open portion corresponding to the transmissive portion of the pixel region and a patterned spacer within the black matrix portion of the pixel region;
 a color filter layer on the buffer layer, the color filter layer having a first thickness within the reflective portion of the pixel region and a second thickness within the transmissive portion of the pixel region;
 a common electrode on the color filter layer; and
 a liquid crystal layer interposed between the transparent electrode and the common electrode,
 wherein the buffer layer and the patterned spacer are one single body with the patterned spacer protruding from the buffer layer through the color filter layer and the common electrode.

20. The device according to claim 19, wherein the patterned spacer contacts a top layer over the first substrate through the liquid crystal layer.

21. The device according to claim 19, wherein the first thickness is substantially one-half of the second thickness.

22. The device according to claim 19, wherein the liquid crystal layer has a third thickness within the reflective portion of the pixel region and a fourth thickness within the transmissive portion of the pixel region, wherein the third thickness is substantially one-half of the fourth thickness.

23. The device according to claim 19, wherein the color filter layer has a step difference along a border between the reflective and transmissive portions of the pixel region.

24. The device according to claim 23, wherein the buffer layer has a thickness within a range of about 2.5 μm to about 4.0 μm.

25. The device according to claim 24, wherein the step difference is within a range of about 2.0 μm to about 2.5 μm.

26. The device according to claim 19, wherein the black matrix has a second open portion corresponding to the pixel region.

* * * * *